(12) United States Patent
Morrill et al.

(10) Patent No.: US 12,072,861 B2
(45) Date of Patent: Aug. 27, 2024

(54) REGULATORY TREE PARSER

(71) Applicant: PwC Product Sales LLC, New York, NY (US)

(72) Inventors: Todd Morrill, Newburgh, NY (US); Eric Roma, Brooklyn, NY (US); Nicolas Kuzak, New York, NY (US); Neelam Sharma, Manalapan, NJ (US); Andrew Runge, Pittsburgh, PA (US); Jayvardhan Rathi, Maharashtra (IN); Waqar Sarguroh, Mumbai (IN); Wenting Zhao, New York, NY (US)

(73) Assignee: PwC Product Sales LLC, New York, NY (US)

( * ) Notice: Subject to any disclaimer, the term of this patent is extended or adjusted under 35 U.S.C. 154(b) by 111 days.

(21) Appl. No.: 17/722,077

(22) Filed: Apr. 15, 2022

(65) Prior Publication Data
US 2022/0374405 A1    Nov. 24, 2022

Related U.S. Application Data

(60) Provisional application No. 63/190,714, filed on May 19, 2021.

(51) Int. Cl.
*G06F 16/22* (2019.01)
*G06F 16/242* (2019.01)
*G06F 40/205* (2020.01)

(52) U.S. Cl.
CPC ........ *G06F 16/2246* (2019.01); *G06F 16/221* (2019.01); *G06F 16/243* (2019.01); *G06F 40/205* (2020.01)

(58) Field of Classification Search
CPC .. G06F 16/2246; G06F 16/243; G06F 16/221; G06F 40/205; G06F 16/93; G06F 16/383; G06F 16/3329
See application file for complete search history.

(56) References Cited

U.S. PATENT DOCUMENTS

| 2010/0185683 A1* | 7/2010 | Baby ..................... G06F 16/81 |
| | | 707/E17.017 |
| 2017/0004205 A1* | 1/2017 | Jain ....................... G06N 5/022 |

(Continued)

FOREIGN PATENT DOCUMENTS

WO    WO-2022140471 A1 *   6/2022    ............. G06F 17/18

*Primary Examiner* — Vaishali Shah
*Assistant Examiner* — Berhanu Mitiku
(74) *Attorney, Agent, or Firm* — Morrison & Foerster LLP

(57) ABSTRACT

Described herein is a regulatory parser that downloads and efficiently processes regulatory documents. The regulatory documents may be from different sources and may have different formats. The regulatory parser parses all of the text in the regulatory documents and converts into a predetermined, single format for downstream applications. The text is organized and stored in a structured tree, organized into one or more hierarchies with nodes storing segments of text from a regulatory document. In some embodiments, each node in the regulatory tree may represent a segment of text. Partitioning the text of a regulatory document into segments of text may make the storage and querying of the regulatory documents more manageable. The organization and structure of the structured tree may reduce the times and resources needed for accessing and searching for a regulatory citation. The structured tree may allow a user to manipulate a regulatory document or text.

18 Claims, 11 Drawing Sheets

(56) References Cited

U.S. PATENT DOCUMENTS

2020/0279271 A1* 9/2020 Gasperecz .............. G06N 5/01
2021/0319173 A1* 10/2021 Gerber, Jr. ............. G06F 16/31
2022/0374914 A1 11/2022 Morrill et al.

* cited by examiner

| Title | Chapter | Part | Sub part | Section | Sub section | Paragraph | Sub paragraph | Text |
|---|---|---|---|---|---|---|---|---|
| 12 | | | | | | | | "Banks and Banking" |
| 12 | x | 1026 | | | ... | | ... | "Truth in Lending (Regulation Z)" |
| 12 | x | 1026 | A | 1026.3 | h | 2 | i | "Downpayment, closing costs, or other similar home buyer assistance, such as principle or interest subsidies" |
| 261 | 262 | 263 | 264 | 265 | 266 | 267 | 268 | 269 |

FIG. 2B

| Bulletin | Level 0 | Level 1 | Level 2 | Level 3 | Text |
|---|---|---|---|---|---|
| 2010-12 | | | | | "Licensing Amendments: Notice of Proposed Rulemaking" |
| 2010-12 | 2 | | | | "Highlights" |
| ... | | | | | |
| 2010-12 | 2 | 1 | 4 | 1 | "Permit an eligible operating subsidiary of a qualifying national bank or FSA to engage in an activity that is substantively the same as a previously approved bank or FSA activity, respectively, by filing a notice with the OCC (national banks) or an application through expedited review (FSAs)." |

FIG. 2C

| "Banks and Banking" | "Bureau of Consumer Financial Protection" | "Truth in Lending (Regulation Z)" | "Exempt transactions. The following transactions are not subject to this part or, if the exemption is limited to specified provisions of this part, are not subject to those provisions:" | "*Partial exemption for certain mortgage loans.* The special disclosure requirements in § 1026.19(g) and, unless the creditor chooses to provide the disclosures described in § 1026.19(e) and (f), in § 1026.19(e) and (f) do not apply to a transaction that satisfies all of the following criteria:" | "The transaction is for the purpose of:" | "Downpayment, closing costs, or other similar home buyer assistance, such as principal or interest subsidies" |

FIG. 7B

REGULATORY TREE PARSER

CROSS-REFERENCE TO RELATED APPLICATION

This application claims the benefit of U.S. Provisional Application No. 63/190,714, filed May 19, 2021, the contents of which are incorporated herein by reference in its entirety for all purposes.

FIELD

This disclosure relates generally to a system that parses text from regulatory document(s) and organizes the parsed text in a structured tree according to intra- and inter-document hierarchies.

BACKGROUND

Traditional regulatory parsers operate at the document level, parsing many pages of text in one batch, or at an arbitrary level of granularity (e.g., paragraph level, sentence level, etc.). These traditional regulatory parsers may not be able to efficiently process a regulatory document or parse all the text. The document level or arbitrary level of granularity may lead to providing incomplete pieces of text, which may not be useful when used by certain downstream applications (e.g., training a machine learn model such as a classifier). The traditional regulatory parsers also do not retain the hierarchical structure of a regulatory document, losing important information such as the relationships between multiple pieces of text in a given regulatory document and between multiple regulatory documents. As a result, a regulatory document may not be indexed, so retrieving text for a regulatory citation may require accessing irrelevant and unnecessary portions of the regulatory document.

Additionally, different regulatory documents may have different formats, forcing downstream applications to handle the regulatory documents using different methods. This adds complexity and time needed for processing regulatory documents. When searching for a segment of the text, the text may not be organized properly, so traditional regulatory parsers may end up accessing unrelated segments, leading to longer search times and inefficient uses of resources. Furthermore, the ability to manipulate (e.g., annotate) the regulatory document or text may be limited.

What is needed is a regulatory parser that efficiently processes a regulatory document and parses all of the text. What is also needed is a regulatory parser that stores the text with a high level of granularity and into a predetermined, single format for downstream applications.

What is needed is an associated structured tree that organizes and stores in accordance with one or more hierarchies of one or more regulatory documents, and stores the text a regulatory document as segments, making the storage and querying of the regulatory documents more manageable, and reducing the times and resources needed for accessing and searching for a segment of text (e.g., regulatory citation).

What is needed is a regulatory tree parser that retains the hierarchical structure of a regulatory document so that relationships between multiple pieces of text in a given regulatory document and between multiple regulatory documents are maintained.

BRIEF SUMMARY

A method is disclosed. The method may comprise: receiving one or more regulatory documents, wherein the one or more regulatory documents are from one or more regulation sources or include one or more regulatory-based words; parsing the one or more regulatory documents, wherein the parsing comprises: partitioning text of the one or more regulatory documents into segments of text, wherein each segment of text is located between adjacent formatting features; organizing the segments of text according to a hierarchy, wherein the hierarchy is indicative of a structure of the segments of text in the one or more regulatory documents, wherein the segments of text are organized into a predetermined, single format; creating a regulatory tree, the regulatory tree including a plurality of nodes and a plurality of edges, each of the plurality of nodes representing one of the segments of text and each of the plurality of edges representing a relationship between two of the segments of text, wherein the creating the regulatory tree comprises: organizing the plurality of nodes in the regulatory tree in levels in the hierarchy; and connecting nodes having different levels in the hierarchy using the plurality of edges; and storing the one or more regulatory trees in a datastore or sending the one or more regulatory trees to one or more downstream applications. In some embodiments, the one or more regulatory documents have different formats when received. In some embodiments, the regulatory tree includes multiple structured trees, each structured tree is associated with one of the one or more regulatory documents, wherein relationships between the one or more regulatory documents are represented by edges connecting the multiple structured trees. In some embodiments, the method further comprises: storing the organized segments of text into one or more files, wherein each of the one or more files includes one or more lines, each of the one or more lines associated with one of the segments of text. In some embodiments, the creating the regulatory tree further comprises: retrieving a targeted line of the one or more lines; concatenating values in non-text fields of the targeted line and inserting columns between the values; storing the concatenated values in one or more first columns; storing a text field of the targeted line in one or more second columns; specifying the one or more first columns as corresponding to the plurality of edges; and specifying the one or more second columns are corresponding to the plurality of nodes. In some embodiments, each of the one or more files includes a line comprising field names. In some embodiments, the organized segments of text of at least two of the one or more regulatory documents are stored in the same file. In some embodiments, the organizing the segments of text includes organizing the segments of text into one or more fields, wherein at least one of the one or more fields includes a reference to an upper level in the hierarchy. In some embodiments, the organizing the segments of text includes organizing the segments of text into one or more fields, wherein at least one of the one or more fields includes a numerical value representative of an upper level of the hierarchy. In some embodiments, the formatting features include alphanumeric-based numbering, symbolic numbering, or positional information. In some embodiments, at least two segments of text in the same level of the regulatory tree is associated with the same type of formatting feature. In some embodiments, at least one of the plurality of nodes stores a corresponding segment of text as a text attribute. In some embodiments, the formatting features of the one or more regulatory documents are determined before the parsing step. In some embodiments, the hierarchy is determined before the parsing step. In some embodiments, the one or more regulation sources include U.S. Code website, Code of Federal Regulations website, Bulletins from the Office of the Comptroller of the Currency website, Federal Research Board website, and Financial Industry Regulatory Authority website.

A method is disclosed. The method may comprise: receiving a leaf node citation; searching for a leaf node in a regulatory tree, wherein the leaf node is associated with the leaf node citation, wherein the regulatory tree includes a plurality of nodes and a plurality of edges, each of the plurality of nodes representing a segment of text and each of the plurality of edges representing a relationship between two segments of text, wherein the plurality of nodes in the regulatory tree are organized in levels of a hierarchy, wherein the hierarchy is indicative of a structure of segments of text in a regulatory document; retrieving a text attribute; prepending the text attribute to a leaf node citation text; traversing to an upper level node of the regulatory tree, the upper level node having a level of the hierarchy higher than a level of the respective node; repeating the retrieving, the prepending, and the traversing steps for each node in a path of the leaf node citation; and providing the leaf node citation text. In some embodiments, the traversing step comprises traversing less than all of the regulatory tree. In some embodiments, each node in the path stores portions of the leaf node citation text. In some embodiments, the leaf node stores a text attribute at an end of the leaf node citation.

A non-transitory computer readable medium is disclosed. The computer readable medium may include instructions that, when executed, perform a method for processing one or more regulatory documents, the method comprises: receiving the one or more regulatory documents, wherein the one or more regulatory documents are from one or more regulation sources or include one or more regulatory-based words; parsing the one or more regulatory documents, wherein the parsing comprises: partitioning text of the one or more regulatory documents into segments of text, wherein each segment of text is located between adjacent formatting features; organizing the segments of text according to a hierarchy, wherein the hierarchy is indicative of a structure of the segments of text in the one or more regulatory documents, wherein the segments of text are organized into a predetermined, single format; creating a regulatory tree, the regulatory tree including a plurality of nodes and a plurality of edges, each of the plurality of nodes representing one of the segments of text and each of the plurality of edges representing a relationship between two of the segments of text, wherein the creating the regulatory tree comprises: organizing the plurality of nodes in the regulatory tree in levels in the hierarchy; and connecting nodes having different levels in the hierarchy using the plurality of edges; and storing the one or more regulatory trees in a datastore or sending the one or more regulatory trees to one or more downstream applications.

BRIEF DESCRIPTION OF THE FIGURES

FIG. 2B illustrates an exemplary output from parsing structured data, according to embodiments of the disclosure.

FIG. 2C illustrates an exemplary output from parsing semi-structured data, according to embodiments of the disclosure.

FIG. 7B illustrates a leaf node citation text, according to embodiments of the disclosure.

DETAILED DESCRIPTION

Figure 1:
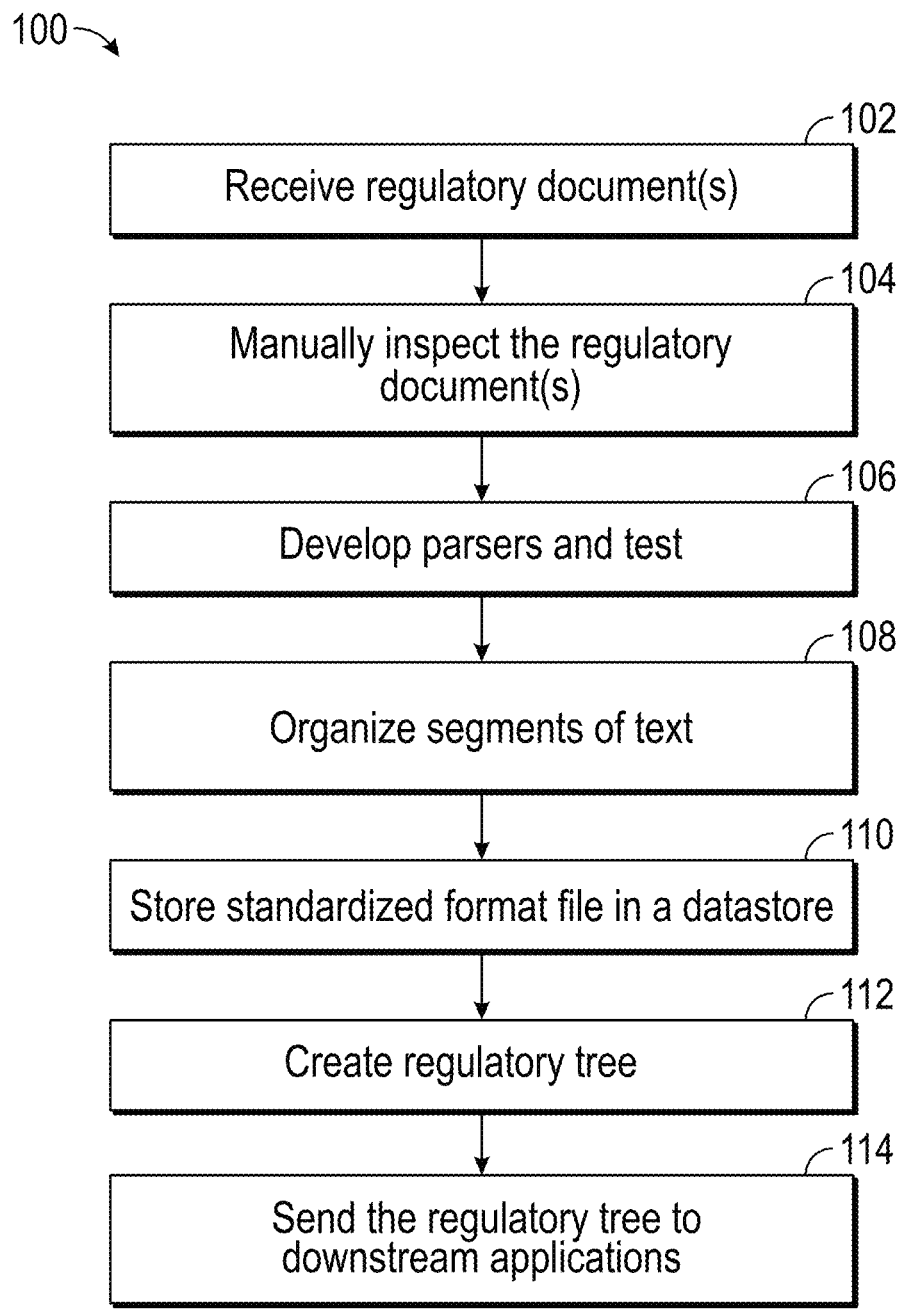
FIG. 1 illustrates a flow chart of an exemplary process of a regulatory tree parser, according to embodiments of the disclosure.

Described herein is a regulatory parser that downloads and efficiently processes regulatory documents. The regulatory documents may be from different sources and may have different formats when received from the sources. The regulatory parser parses all of the text in the regulatory documents and converts into a predetermined, single format for downstream applications.

The text is organized and stored in a structured tree. The structured tree may be organized into one or more hierarchies with nodes storing segments of text from a regulatory document. In some embodiments, each node in the regulatory tree may represent a segment of text. Partitioning the text of a regulatory document into segments of text may make the storage and querying of the regulatory documents more manageable. The organization and structure of the structured tree may reduce the times and resources needed for accessing and searching for a regulatory citation. The structured tree may allow a user to manipulate (e.g., annotate) a regulatory document or text.

Embodiments of the disclosure include a regulatory tree parser that includes a regulatory tree having a root node connected to multiple structured trees. The multiple structured trees may be subtrees to the regulatory tree. In some embodiments, each structured tree is associated with a regulatory document and may represent the intra-document hierarchy of the corresponding regulatory document. In some embodiments, the node having the highest level in each structured tree may be a child node to the root node. For example, a first structured tree may represent all CFR regulations, a second structured tree may representation all USC regulations, etc. In some embodiments, at least two structured trees may have different hierarchical structures. The regulatory tree parser may represent the relationships between multiple regulatory documents and inter-document hierarchies. The relationships may be represented by edges connecting nodes in the structured trees. In some embodiments, each of the plurality of edges may represent a relationship between two segments of text or two regulatory documents.

The following description is presented to enable a person of ordinary skill in the art to make and use various embodiments. Descriptions of specific devices, techniques, and applications are provided only as examples. These examples are being provided solely to add context and aid in the understanding of the described examples. It will thus be apparent to a person of ordinary skill in the art that the described examples may be practiced without some or all of the specific details. Other applications are possible, such that the following examples should not be taken as limiting.

Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to a person of ordinary skill in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combination of one or more of the associated listed items. It will be further understood that the terms "includes," "including," "comprises," and/or "comprising," when used in this specification, specify the presence of stated features, integers, steps, processes, elements, and/or components, but do not preclude the presence or addition of one or more other features, integers, steps, processes, elements, components, and/or groups thereof.

Overview of an Exemplary Regulatory Tree Parser

As discussed in more detail below, the disclosed regulatory tree parser receives input data and produces one or more structured trees that allows the input data to be easily stored and manipulated. A structured tree may be a tree (or subtree) that includes all text from a regulatory document. In some embodiments, the structured tree may enable indexing of the segments of text in a regulatory document such that text may be searched and retrieved without having to access the entire regulatory document. A regulatory document may be indexed according to formatting features, such as alphanumeric-based numbering (e.g., lowercase letters, uppercase letters, numbers, roman numerals, etc.), symbolic numbering (e.g., solid bullet points, empty bullet points, etc.), or positional information (e.g., indentation, line breaks, etc.).

In some embodiments, the input data may be a regulatory document including text. Regulatory documents may have different formats (e.g., Extensible Markup Language (XML), Hypertext Markup Language (HTML), JavaScript Object Notation (JSON), Portable Document Format (PDF), raw text data, etc.), and the disclosed regulatory tree parser may be capable of converting the text of different formats into a predetermined, single format. The regulatory tree parser generates one or more structured tree(s) representing one or more hierarchies of one or more regulatory documents. A hierarchy may represent the structure of a regulatory document, arranged according to formatting features. In some embodiments, nodes at different levels in the hierarchy are associated with different formatting features. In some embodiments, at least two nodes at the same level in the hierarchy may be associated with the same formatting feature. The one or more regulatory documents may be from a regulation source and/or may include one or more regulatory-based words.

The structured tree(s) organizes the segments of text into multiple levels and stores the segment of the text as metadata of a node in a structured tree with a one-to-one correspondence. In some embodiments, each node in the regulatory tree may represent metadata (e.g., text attributes) for a single segment of text. The storage of text attributes in nodes, such as leaf nodes, may reduce the amount of time needed for retrieving text for, e.g., latency sensitive applications. In some embodiments, each segment of text may be the text between adjacent formatting features in a regulatory document.

FIG. 1 illustrates a flow chart of an exemplary process 100 of a regulatory tree parser, according to embodiments of the disclosure. In step 102, one or more regulatory documents are received. The one or more regulatory documents may be from a regulation source or may include one or more regulatory-based words.

The regulatory tree parser may receive the regulatory documents by downloading them from one or more websites, for example. Different regulatory documents may come from different sources and may be in different formats. For example, the regulatory tree parser may download XML files for Titles 12, 15, 31, and 50 from the U.S. Code (USC) website, XML files for Titles 12, 17, and 31 from the Code of Federal Regulations (CFR) website, HTML files for all Bulletins from the Office of the Comptroller of the Currency (OCC) website, HTML files for all Supervision and Regulation (SR) Letters from the Federal Reserve Board (FRB) website, HTML files for all Financial Industry Regulatory Authority (FINRA) from the FINRA website, or a combination thereof. Embodiments of the disclosure may include downloading files having other types of formats such as JSON, PDF, raw text data, or the like. In some embodiments, step 102 may include unzipping one or more files.

In step 104, the regulatory documents may be manually inspected. In some embodiments, a user may manually inspect the regulatory documents and the respective hierarchies. The manual inspection step may be used to determine one or more properties, such as the structure and formatting feature(s), of a regulatory document and associated hierarchy. For example, the manual inspection may be used to determine that segments of text in a regulatory document comprising a first formatting feature (e.g., letters) followed by a second formatting feature (e.g., numbers), then followed by a third formatting feature (e.g., roman numerals). The one or more properties may be determined before and used in step 106 to develop and test the regulatory parser.

In step 106, the regulatory parser is developed. The regulatory parser may be developed by partitioning the text in the regulatory document(s) into segments of text. In some embodiments, each segment of text may be located between adjacent formatting features.

The regulatory parser may include one or more parsers. In some embodiments, each parser may be used to parse different types of formats. For XML files, the regulatory document may be parsed by using XML parsing in Python. For HTML files, the regulatory document may be parsed by using Python and the Beautiful Soup library. For JSON and PDF files, the regulatory document may be parsed using Python. Although the above paragraph discusses Python, embodiments of the disclosure may include other types of programming languages for developing the regulatory parser. Java is one non-limiting example.

The regulatory parser may determine the hierarchy of a regulatory document, and using this hierarchy, it may create parent-child relationships between different types of segments of text (e.g., sections, paragraphs, sentences, bullets, and other aggregations of text). The hierarchy and these relationships may be later used to generate the regulatory tree.

In some embodiments, step 106 also includes testing the regulatory parser. The regulatory parser may be tested by determining an expected output from the parser and determining whether the actual output matches, or is similar to, the expected output. If the actual output does not match, or is not similar to, the expected output, the differences between the two may be determined, and the regulatory parser may be fixed using such information.

In some embodiments, the regulatory parser may be capable of parsing any type of format. In some embodiments, the regulatory parser may notify the developer of errors that may occur. The errors may be used to determine the accuracy of the parser. Using the error information, the regulatory parsers may be optimized to improve its accuracy.

In step 108, the regulatory parser may organize the segments of text according to the hierarchy and into a predetermined, single format. The predetermined, single format may be a general purpose format such as a comma-separated value (CSV) format, for example. The OCC Bulletins, FRB SR Letters, and FINRA regulatory documents may also be parsed, and the segments of text may be converted into the predetermined, single format. Step 108 is discussed in more detail below.

The organization of the segments of text in step 108 may include automatically assigning sequence information (e.g., level 1, 2, 3, etc.) to the levels in the hierarchy, in some embodiments. The parser may assign the levels in the hierarchy to the segments of text, while it parses a regulatory document or after.

In step 110, the segments of text may be stored in one or more predetermined, single format files in a datastore. In some embodiments, the segments of text of at least one regulatory document are stored together, in a file separate from other regulatory documents. For example, each CFR and USC regulatory document may be stored in a separate file. In some embodiments, the segments of text of at least two regulatory documents may be stored in the same file. For example, all OCC Bulletins and FRB Letters may be stored in the same file. In some embodiments, the number of regulatory documents stored in a single file may be based on size of the regulatory document(s). Smaller documents (e.g., a single web page) may be stored in the same file. In some embodiments, the regulatory documents may be stored in separate files to facilitate the parallel development and testing of the parsers, parallel processing of the regulatory documents, and/or the modularity of the parsers.

The regulatory tree parser takes the segment of text (in predetermined, single format) from the regulatory document(s) and creates one or more structured trees forming a regulatory tree (step 112). The regulatory tree may include nodes located at different levels, where the levels and connections between the nodes represent intra- and inter-document hierarchies and relationships. Step 112 is discussed in more detail below.

In step 114, the regulatory tree is stored and/or sent to one or more downstream applications, such as a machine learning model, e.g., a classifier (regulation obligation identifier). In some embodiments, information from the regulatory tree may be extracted and sent to one or more downstream applications. For example, the information may be sent to a compliance team in the form of, e.g., a spreadsheet. The compliance team can use the information to determine whether certain text is applicable to a business, whether the business is complying, etc. As another example, the regulatory tree may be stored in-memory using a graph data structure, in a flat CSV file, and/or in a SQL database.

Exemplary Parsing of Regulatory Documents

As discussed above, the regulatory parser may parse the regulatory documents and convert the text into a predetermined, single format, such as CSV format. A regulatory document may have one or more segments of text, and each segment of text may be stored as a separate line in the predetermined, single format file. That is, each line may be associated with one of the segments of text. A regulatory document may have segments of text organized according to a hierarchy. The levels in the hierarchy may be denoted differently for different document types (discussed below). Exemplary document types include structured data (e.g., files from the USC or CFR website, HTML files, XML files, JSON files, etc.) and semi-structured data (e.g., files from the OCC website, PDF files, arbitrary text, etc.). Structured data may be denoted by alphanumeric-based numbering (e.g., lowercase letters, uppercase letters, numbers, roman numerals, etc.), and semi-structured data may be denoted by symbolic numbering or positional information (e.g., solid bullet points, empty bullet points, indentation, line breaks, etc.), for example.

Figure 2A:
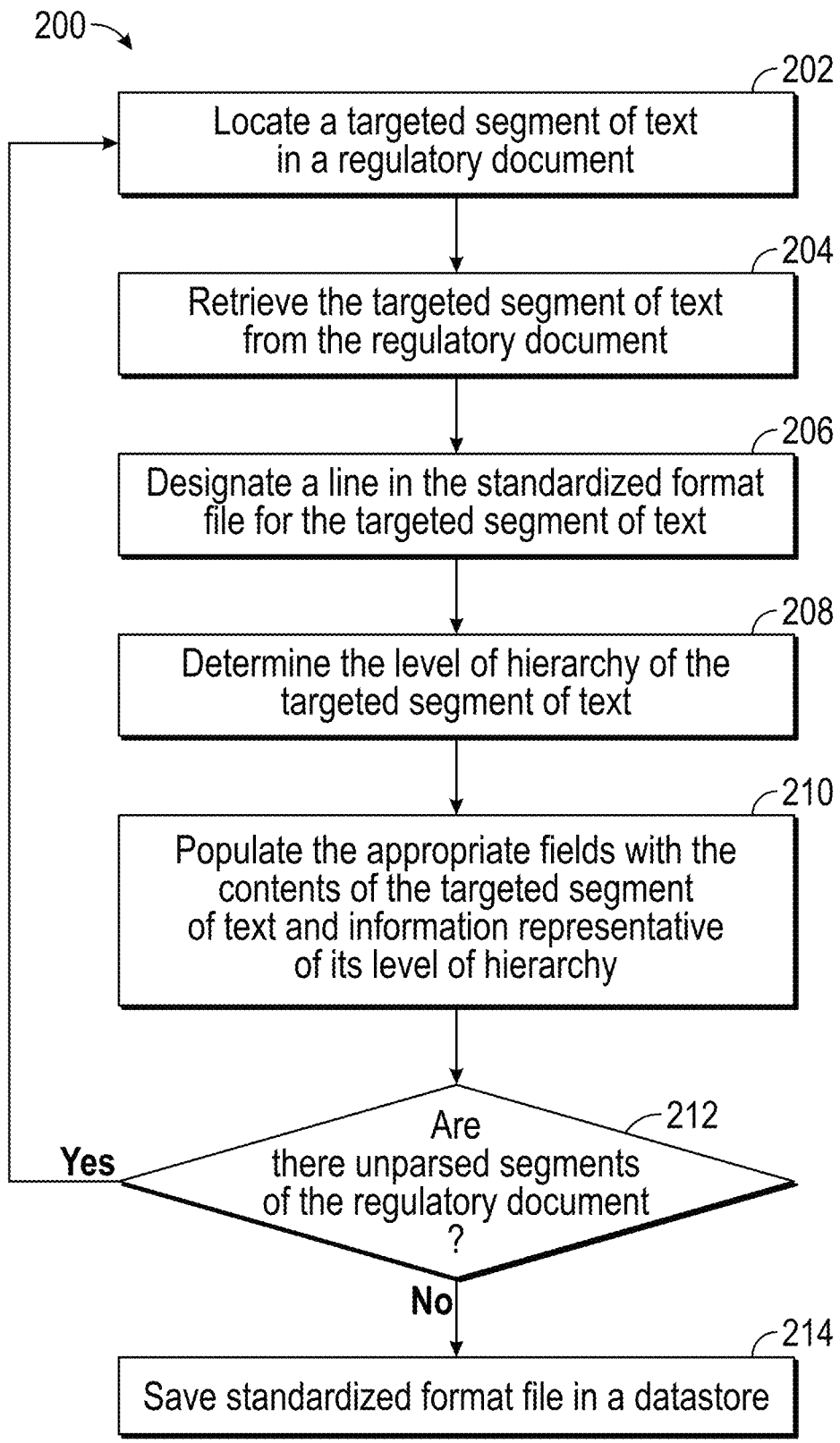
FIG. 2A illustrates a flow chart of an exemplary process for parsing a regulatory document, according to embodiments of the disclosure.

FIG. 2A illustrates a flow chart of an exemplary process 200 for parsing a regulatory document, according to embodiments of the disclosure. The regulatory parser of the disclosure may be capable of processing different levels of granularity: complete documents, paragraphs, sentences, sentence fragments (e.g., elements in a bulleted list).

In step 202, the regulatory parser partitions text of a regulatory document into segments of text by locating a targeted segment of text. A targeted segment of text may be located based on formatting features. In some embodiments, the targeted segment of text may be text located between adjacent formatting features. The regulatory parser also determines what text is included in the targeted segment of text. This step includes the regulatory parser reading the targeted segment of text from the regulatory document. In some embodiments, each segment of text may be read and then organized according to a hierarchy and into predetermined, single format before proceeding to the next segment of text. The hierarchy that the segment of text is organized into may be the same hierarchy as the respective regulatory document. This hierarchy may be indicative of the structure of the segments of text in the regulatory document(s).

The regulatory parser retrieves the segment of text from the regulatory document (step 204) and designates a line (in the file, such as a CSV file) for the segment of text (step 206).

In step 208, the regulatory parser uses the level of hierarchy for the segment of text determined during parsing. If the regulatory document includes structured data, then the level of hierarchy may be determined by using the encoded structural information. The encoded structural information may include alphanumeric-based numbering, such as "(a)," "(i)," "I.," etc. In some embodiments, each level in the hierarchy may be associated with the same type of formatting feature (e.g., alphanumeric-based numbering). For example, the first level may be associated with "(a)," "(b)," "(c)," etc.; and the second level may be associated with "(i)," "(ii)," "(iii)," etc. In some embodiments, at least two segments of text (and nodes) in the same level of a regulatory tree (or subtree) may be associated with the same formatting feature.

If the regulatory document includes semi-structured data, the level of hierarchy may be determined based on the inferred structural information. The inferred structural information may include symbolic numbering or positional information, such as "●," "○," "■," etc. In some embodiments, each level in the hierarchy may be associated with a type of symbolic numbering or positional information. For example, the first level may be associated with "●" (or one tab); and the second level may be associated with "○" (or two tabs). In some embodiments, at least two segments of text (and nodes) in a level of a regulatory tree (or subtree) may be associated with the formatting feature.

In some embodiments, the regulatory parser may use hierarchical information from other segments of text to determine the hierarchical information of a targeted segment of text. For example, a targeted segment of text may have a second level in the hierarchy. When the regulatory parser is determining the level of the targeted segment of text, the regulatory parser may use the hierarchical information from a segment of text having a first level.

In step 210, the regulatory parser populates one or more fields with the contents of the segment of text and/or information representative of its level of hierarchy. For example, a line in the file may include information about the level (e.g., references to upper levels in the hierarchy or numerical values representative of the upper levels). In some embodiment, each line in the file may include the complete hierarchical index lineage from the highest level to the targeted segment of text. In some embodiments, the targeted segment of text may be processed (e.g., removing formatting such as bold or italic fonts) before the respective field is populated. In some embodiments, additional information may be added to a line. Exemplary additional information may include, but is not limited to, the corresponding regulator.

In step 212, the regulatory parser determines whether there are unparsed segments in the regulatory document. If so, the next unparsed segment is considered the targeted segment of text, and the process is repeated. Embodiments of the disclosure may include determining there is non-text information in the regulatory document such as images, tables, and citations. The non-text information may be discarded or saved separately.

If not, the regulatory parser saves the predetermined, single format file in a datastore (step 214) and has completed parsing the regulatory document (step 214). Process 200 may be used to parse other regulatory documents. In some embodiments, multiple processes 200 may be implemented, each parsing a different regulatory document. In some embodiments, at least two processes 200 may be implemented in parallel.

FIG. 2B illustrates an exemplary output 250 from parsing structured data, according to embodiments of the disclosure. The output is shown in the figure in table format, where rows represent lines and columns represent fields of a predetermined, single format file. Structured data may be data in a regulatory document that includes encoded structural information. This structural information can be used for organizing the text into a certain structure (e.g., level) of a regulatory tree.

One example portion of a regulatory document is the citation "12 CFR 1026.3(h)(2)(i)." The citation has eight segments, and its output 250 includes nine fields: Title field 261, Chapter field 262, Part field 263, Subpart field 264, Section field 265, Subsection field 266, Paragraph field 267, Subparagraph field 268, and Text field 269. In some embodiments, the field names may be stored as a line in the file. In some embodiments, the number of fields may be equal to the number of segments plus one.

The first line 252 is for the first segment, Title 12. The Title field 261 is populated with "12," and the Text field 269 is populated with "Banks and Banking." The first segment has the highest level in the hierarchy for the citation, so all other fields 262-268 are empty for the first line 252.

The third line 254 is for the third segment, Part 1026. The Part field 263 is populated with "1026," and the Text field 269 is populated with "Truth in Lending (Regulation Z)." The third segment belongs to a lower level in the hierarchy for the citation, so fields for upper levels are populated. For example, as shown the Title field 261 and Chapter field 262 are populated with corresponding values. The third segment has the third, but not lowest, level in the hierarchy for the citation, so fields 264-268 (representing lower levels) are empty for the third line 254.

The eighth line 256 is for the eighth segment, Subparagraph (i). The Subparagraph field 268 is populated with "i," and the Text field 269 is populated with "Downpayment, closing costs, or other similar home buyer assistance, such as principal or interest subsidies." The eighth segment belongs to the lowest level in the hierarchy of the citation, so all fields are populated. The fields are populated to represent the upper levels in the hierarchy. The Title field 261 is populated with "12," the Chapter field 262 is populated with "X," the Part field is populated with "1026," the Subpart field 264 is populated with "A," the Section field 265 is populated with "1026.3," the Subsection field 266 is populated with "h," and the Paragraph field 267 is populated with "2."

The output from parsing semi-structured data is similar to the output from parsing structured data (discussed above), except that the fields include numerical values representative of the upper level(s) in the hierarchy for a given line, rather than references.

FIG. 2C illustrates an exemplary output 270 from parsing semi-structured data, according to embodiments of the disclosure. The output is shown in the figure in table format, where rows represent lines and columns represent fields of a predetermined, single format file. Semi-structured data may be data in a regulatory document that does not include encoded structural information, but the structure of the document may be determined based on symbolic numbering, positional information (e.g., indentation, bullet points, etc.), or a combination thereof. This structural information can be used for organizing the text into a certain structure (e.g., level) of a regulatory tree.

One example portion of a regulatory document is the citation to the first sub-bullet in OCC Bulletin 2020-12. The first sub-bullet states "Permit an eligible operating subsidiary of a qualifying national bank or ISA to engage in an activity that is substantively the same as a previously approved bank or FSA activity, respectively, by filing a notice with the OCC (national banks) or an application through expedited review (FSAs)." The citation has five segments, and its output 270 includes five fields: Bulletin field 291, Level0 field 292, Level1 field 293, Level2 field 294, Level3 field 295, and Text field 296. In some embodiments, the field names may be stored in the file. In some embodiments, the number of fields may be equal to the number of segments plus one.

The first line 283 is for the first segment, Bulletin 2010-12. The Bulletin field 291 is populated with "2010-12," and the Text field 292 is populated with "Licensing Amendments: Notice of Proposed Rulemaking." The first segment has highest level in the hierarchy for the first sub-bullet, so all other fields 292-295 are empty for the first line 283.

The second line 284 is for the second segment, which in the example refers to the second section of the regulatory document. The Level0 field 292 is populated with "2" (to represent the section number), and the Text field 296 is populated with the corresponding text "Highlights." The second segment belongs to the second level in the hierarchy for the citation, so the field for the first, highest level is populated. In this example, the Bulletin field 291 is the field for the first, highest level, and thus is populated with "2020-12" for the second line 284. The remaining fields 293-295 for the second line 284 are empty.

The fifth line 286 is for the fifth segment, the first sub-bullet. The first sub-bullet is on the fifth level in the hierarchy of the citation, so all fields in the fifth line 286 are populated. The Bulletin field 291 and Level0 field 292 have the same values as the first line 282 and second line 284. The Level1 field 293 has a value of "1" to represent the subsection number. The Level2 field 294 has a value of "4" to represent the bullet number, and the Level3 field 295 has a value of "1" to represent the sub-bullet number. The Text field 296 is populated with the text corresponding to the first sub-bullet.

In some embodiments, each line in the predetermined, single format file has a one-to-one correspondence with a segment of text in a regulatory document. In this manner, one or more lines may be used for a leaf node citation (discussed below). The output from the regulatory parser, as shown in the examples of FIGS. 2B-2C, allows the structure of a regulatory document to be determined and maintained.

Exemplary Regulatory Tree

Embodiments of the disclosure include generating and updating a regulatory tree. The regulatory tree may be updated or regenerated when a regulatory document is changed or added to a regulation, or at periodic time intervals. The regulatory tree may include nodes that represent segments of text included in a regulatory document. The nodes may be organized according to levels of hierarchy, with edges connecting nodes to represent the intra- and inter-hierarchies of one or more regulatory documents. The regulatory tree can include subtrees and leaf nodes. The subtrees can organize and group segments of text together to make searching and accessing more manageable. The leaf nodes may be used to traverse one or more nodes and/or one or more edges of a subtree. In this manner, only portions of the regulatory tree (corresponding to less than all of the regulatory document) may need to be accessed to determine the text of a regulatory citation. In some embodiments, the portions accessed may include only nodes storing segments of text of the regulatory citation of interest. The regulatory tree of the disclosure may be capable of retrieving segments of text having different levels of granularity: complete documents, paragraphs, sentences, sentence fragments (e.g., elements in a bulleted list). In some embodiments, the system may allow a user to select the level of granularity of text retrieved in a query.

Figure 3:
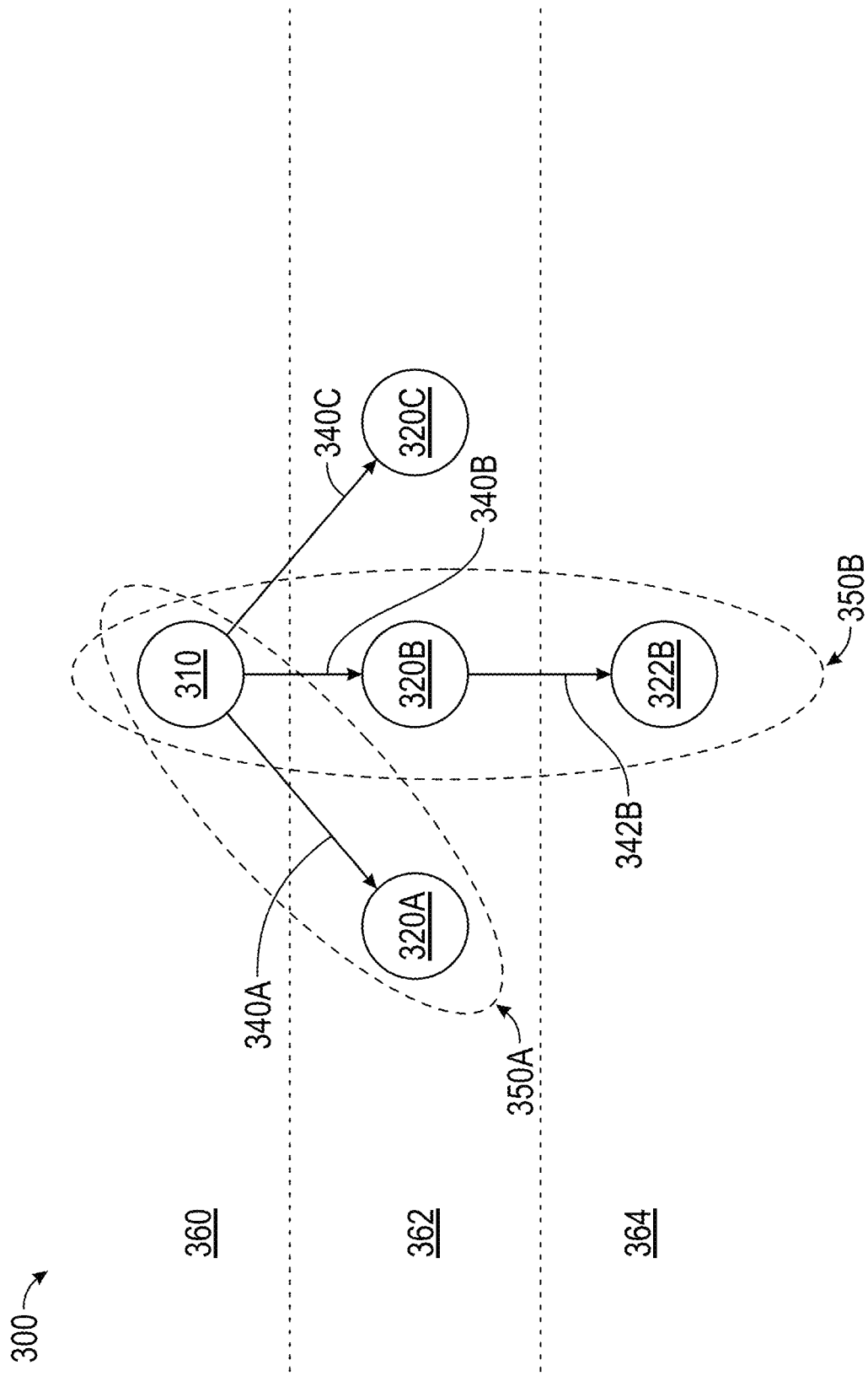
FIG. 3 illustrates an exemplary simplified regulatory tree, according to embodiments of the disclosure.

FIG. 3 illustrates an exemplary simplified regulatory tree, according to embodiments of the disclosure. The regulatory tree 300 may include a plurality of nodes, which represent information included in a regulatory document. Embodiments of the disclosure may include multiple types of nodes, such as one or more parent nodes, one or more child nodes, and one or more leaf nodes. A node may be of multiple types. For example, a node may be both a child node and leaf node.

A parent node may be a node that is located at a higher level in the hierarchy than one or more connected child nodes. In some embodiments, a parent node may be located at the highest level in the hierarchy for a given leaf node citation.

A child node may be a node that is located at a lower level in the hierarchy than its parent node. A child node may be connected to its parent node through one edge. For example, as shown in FIG. 3, the child nodes 320A, 320B, and 320C may have the same parent node 310 and may be connected to it through edges 340A, 340B, and 340C, respectively. The parent node 310 may be located a first level 360 in the hierarchy, and the child nodes 320A, 320B, and 320C may be located at a second level 362. The first level 360 may be a higher level in the hierarchy than the second level 362.

In some embodiments, a node may be connected to both a parent node and a child node. For example, in FIG. 3A, the node 320B may be a child node, connected to its parent node 310 through edge 340B. The node 320B may also be a parent node, connected to its child node 322B, as shown by the edge 342B. The child node 322B may be located on a third level 364, a level lower than its parent node 320B is located on (the second level 362).

The regulatory tree can use leaf node citations for retrieving text, e.g., in response to a query. Embodiments of the disclosure may include receiving and responding to queries having different levels of granularity for leaf node citations. In some embodiments, the leaf node citation may include multiple segments of text that when linked together may form a complete sentence or paragraph. A leaf node citation having a higher level of granularity may be used to train a machine learning model, such as a classifier (e.g., regulation obligation identifier). A first example leaf node citation is "CFR:12:1026:1026.3:h:2:i." A second example leaf node citation (having a lower level of granularity than the first example) is "CFR:12:1026." When the second example leaf node citation is received, the system may access those node(s) in the regulatory tree that have the "CFR:12:1026" node as a parent node.

A leaf node is a node that is located at the lowest level of a path. A path 350 may refer to a plurality of nodes connected through one or more edges. In some embodiments, each node in a path may be located at a different level in the hierarchy. For example, the child node 320A may be a leaf node because it the node located at the lowest level of the path 350A. The node 320B may not be a leaf node because it not located at the lowest level of the path 350B, having a child node 322B. In some embodiments, a path may represent a citation in a regulatory document. A regulatory tree may be traversed by following a path, where the nodes in the path are used to collectively generate a leaf node citation text (each node in the path stores portions of the leaf node citation text).

Embodiments of the disclosure may include mapping nodes to informal names of law and regulations (e.g., "Truth in Lending," "Regulation Z," etc.). The system may allow a user to search for text by using the informal names. The informal names may be mapped to the corresponding leaf node citation (e.g., "CFR:12:1026").

A node may be associated with other types of information including, but not limited to, the name of a regulatory document, the name of a regulator, the document type (e.g., an 'LET' node may represent an FRB SR Letter), a title (e.g., "CFR:12"), documents (e.g., "BUL:2020-12"), its relationship with its siblings (e.g., "12 CFR 215.1" has a relationship of "1," "12 CFR 215.2" has a relationship of "2," etc.), and the subpart of a part. The regulatory tree may also be used to understand a regulation or a regulator as a whole. Information associated with a node may be stored as metadata.

The structure of the regulatory tree may represent relationships between segments of the text using nodes and connected edges. For example, the regulatory tree may represent a relationship between a preamble and nested bullet points by having a first node represent the preamble, a plurality of second nodes representing bullet points, and a plurality of edges. Each of the edges may connect the first node to one of the second nodes. The first node may be located on a first level, and the second nodes may be located on a second level. The different levels may indicate the structure of the regulatory document. Since the first node is located on the first level, associated text may be the preamble. The second nodes located on the second level may be for text that are part of the nested bullet points.

Figure 4:
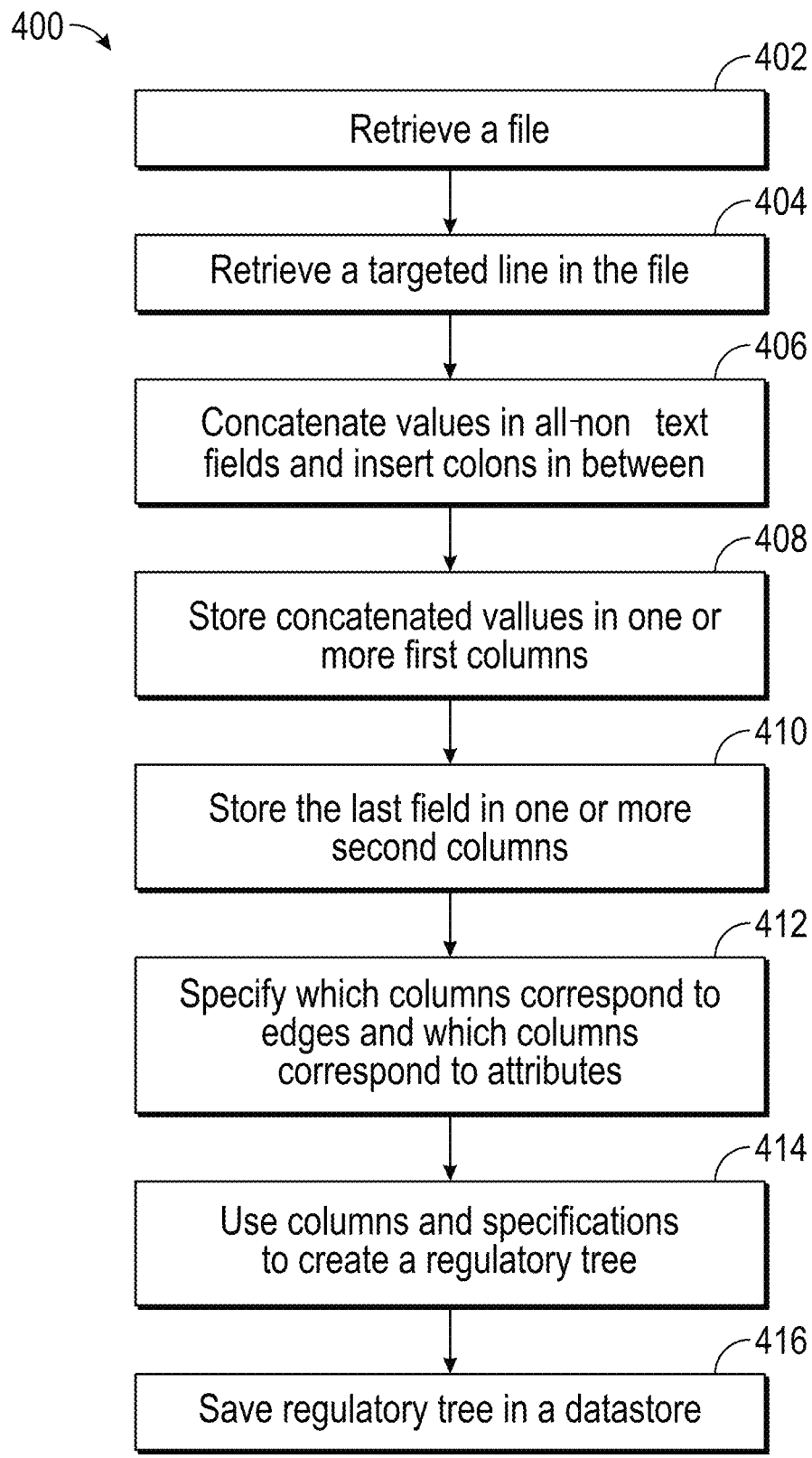
FIG. 4 illustrates a flow chart of an exemplary process for generating a regulatory tree, according to embodiments of the disclosure.

FIG. 4 illustrates a flow chart of an exemplary process 400 for generating a regulatory tree, according to embodiments of the disclosure.

In step 402, the text to be stored and organized in a regulatory tree is received. This step may include retrieving a predetermined, single format file from, e.g., a datastore. A node representing the regulation (referred to as a regulation node) may be added to a regulatory tree. Using the exemplary regulatory tree 500 in FIG. 5, a regulation node may be node 501. In step 404, a targeted line of the predetermined, single format file is retrieved. As discussed above, each line represents a segment of text in a regulatory document. For example, the first line 252 of output 250 (shown in FIG. 2B) may be retrieved.

In step 406, the values in non-text fields are concatenated and colons are inserted in between the values. In some embodiments, the non-text fields may be all fields except the last field of the targeted line in the file.

In step 408, the concatenated values are stored in one or more first columns for the targeted line. The text in the text field is stored in one or more second columns. In some embodiments, the text field may be the last field of the targeted line in the file.

In step 410, the columns that correspond to edges (e.g., one or more first columns) and the columns that correspond to text attributes of nodes (e.g., one or more second columns) are specified. The one or more first columns, the one or more second columns, and the specifications are then used to create a regulatory tree (step 414). In some embodiments, the columns and specifications may be passed in tabular format, such as a Pandas dataframe. The node IDs and parent IDs may be generated one line (row) at a time. The networkx library may be used to create the regulatory tree. The networkx library may create nodes followed by edges one at a time from the information specified in the Pandas dataframe.

In step 416, the regulatory tree is saved in a datastore.

Figure 5:
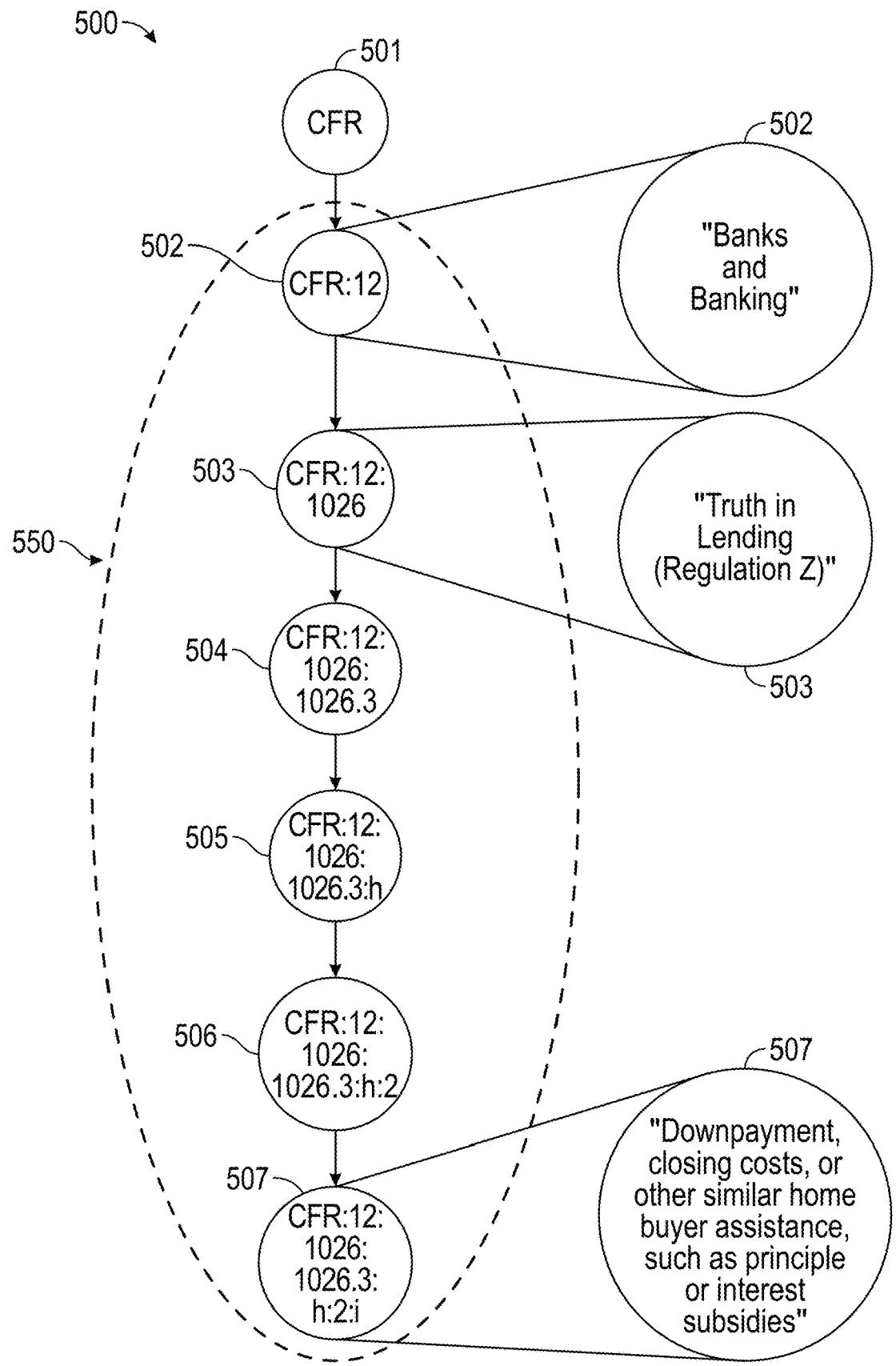
FIG. 5 illustrates an exemplary regulatory tree corresponding to the output of FIG. 2B, according to embodiments of the disclosure.

FIG. 5 illustrates an exemplary regulatory tree 500 corresponding to the output of FIG. 2B, according to embodiments of the disclosure. In some embodiments, a leaf node may be used for leaf node citations. A leaf node citation may be associated with a path in a regulatory tree, the path having a plurality of nodes, and each node storing a corresponding text attribute. In some embodiments, at least one of the plurality of nodes stores a corresponding segment of text as a text attribute. In some embodiments, at least one of the plurality of nodes (e.g., a regulation node, such as node 501) does not store a corresponding segment of text as a text attribute.

The path is from a parent node to a leaf node (or vice-versa) and includes all connected nodes in the regulatory tree between the parent node and the leaf node. The leaf node citation may be used for CFR and USC regulations, for example. Using the example CFR citation "12 CFR 1026.3 (h)(2)(i)," the leaf node citation may be "CFR:12:1026: 1206.3:h:2:1." In the regulatory tree 500 of FIG. 5, the corresponding path is path 550. The parent node for the path 550 is node 502, and the leaf node is node 507. Each node in the path 550 may store a text attribute of the leaf node citation. The text attribute corresponds to a segment of text in the leaf node citation. The parent node 502 has a text attribute of "Banks in Banking," and it is connected to node 503 (which has a text attribute of "Truth in Lending (Regulation Z)." Node 503 is connected to nodes 504-506, which also have text attributes (not shown). Node 507 has a text attribute of "Downpayment, closing costs, or other similar home buyer assistance, such as principle or interest subsidiaries." The parent node 502 is not connected to an upper level node in the path 550. The leaf node 507 does not have a child node, as shown in the figure.

Figure 6:
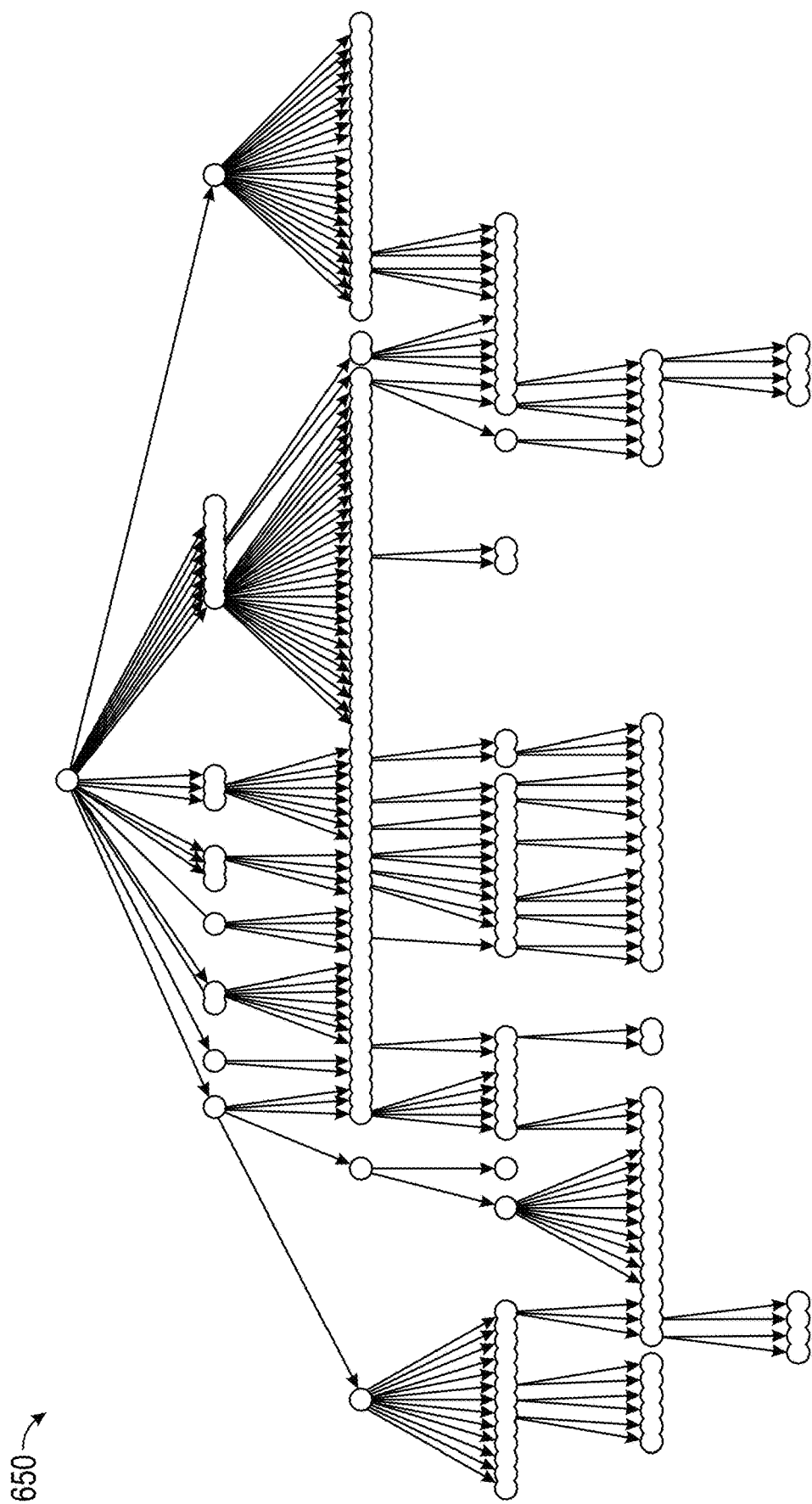
FIG. 6 illustrates an exemplary regulatory tree having multiple paths, according to embodiments of the disclosure.

Although FIG. 5 illustrates an example of one path of a regulatory tree. A regulatory document may have multiple paths, as shown in the regulatory tree 650 of FIG. 6.

Figure 7A:
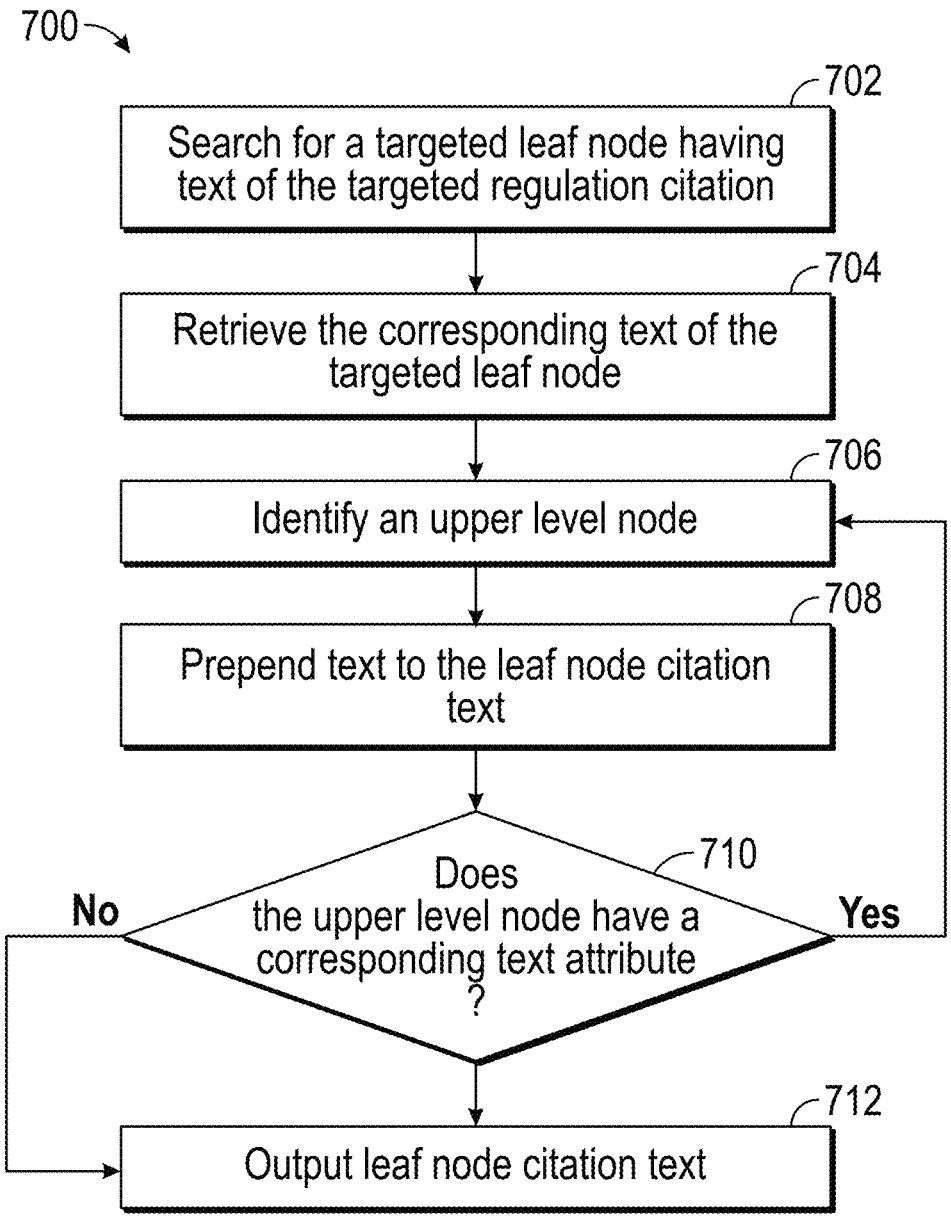
FIG. 7A illustrates a flow chart of an exemplary process for generating text for a leaf node citation, according to embodiments of the disclosure.

FIG. 7A illustrates a flow chart of an exemplary process 700 for generating a leaf node citation text, according to embodiments of the disclosure.

The system receives a leaf node citation. In step 702, the system searches for a targeted leaf node. A targeted leaf node may be a leaf node having a text attribute at the end of the targeted regulation citation (a regulation citation of the leaf node citation). In some embodiments, the leaf node may have the lowest level of granularity of all nodes used to generate text for the leaf node citation.

The leaf node may be identified by traversing the tree from the top and following the path based on each node in the leaf node citation, beginning with the node having the highest (first) level, moving to the corresponding connected node of the next, lower (second) level, moving to the corresponding connected node of the next, lower (third) level, etc. until the leaf node is identified. For example, for the citation "CFR:12:1026:1026.1," the system begins with the "CFR" node on the first level, then moves down to the second level to find "12," followed by moving down to the third level to find "1026," and finally, moving down to the fourth level to find "1026.1" as the leaf node.

Once the leaf node is identified, the nodes along the corresponding path of the leaf node citation are traversed. The traversal includes starting with the leaf node and retrieving the corresponding text, in step 704. In the 12 CFR 1026.3(h)(2)(i) example, the leaf node 507 would be identified and its corresponding text ("Downpayment, closing costs, or other similar home buyer assistance, such as principal or interest subsidies") would be retrieved. The corresponding text may be prepended to the leaf node citation text, concatenating the string together, and accumulating a longer and longer string. For example, the corresponding text may be added to the leaf node citation text, as shown in FIG. 7B. In some embodiments, a memory buffer (not shown), that is later read out when the path traversal is complete, may be used. The memory buffer may be any type of memory buffer, such as last in, first out (LIFO).

In step 706, an upper level node is identified as the parent node. In the 12 CFR 1026.3(h)(2)(i) example, the node 506 would be identified. If there is no connected upper level node or the connected upper level has an empty text attribute, then the leaf node citation is complete. In some embodiments, the query may specify information such as the parent node, a number of parents to get text from, a specific type of parent (e.g., a section or part of a regulation), etc.

In step 708, the associated text is prepended to the leaf node citation text. If there is a connected upper level node, then in step 710, the upper level node is checked to determine whether it has a text attribute. If it does, then steps 706, 708, and 710 are repeated until the path traversal is complete. In the 12 CFR 1026.3(h)(2)(i) example, the corresponding text ("The transaction is for the purpose of:") for node 506 would be retrieved and prepended to the leaf node citation text, as shown in FIG. 7B.

In the 12 CFR 1026.3(h)(2)(i) example, the node 505 would be identified and its corresponding text ("Partial exemption for certain mortgage loans. The special disclosure requirements in § 1026.19(g) and, unless the creditor chooses to provide the disclosures described in § 1026.19(e) and (f), in § 1026.19(e) and (f) do not apply to a transaction that satisfies all of the following criteria:") is prepended to the leaf node citation text. Text corresponding to nodes 502-504 would be identified and also prepended.

In step 712, the traversal of the path is complete. The leaf node citation, which includes the entire text from the regulatory citation (leaf node citation text), is provided. This process for generating the text for a leaf node citation is unlike traditional regulatory parsers, which may generate only a subset of the entire text (e.g., "Downpayment, closing costs, or other similar home buyer assistance, such as principal or interest subsidies"). As a result, the leaf node citation process may generate text having a higher level of granularity. The higher level of granularity may enhance the speed and accuracy of downstream applications, such as when training a machine learning model, such as a classifier.

As shown above, text may be retrieved from a regulatory document using the same steps for structured and semi-structured data formats. The text generated may be the entire text of a regulation citation, in some embodiments. Alternatively, embodiments of the disclosure may include generating a subset of the text and/or a list of leaf node citation texts (e.g., corresponding to a high-level citation query, or a complete verbatim document) using the same regulatory tree.

Exemplary System for Implementing the Regulatory Tree Parser

Figure 8:
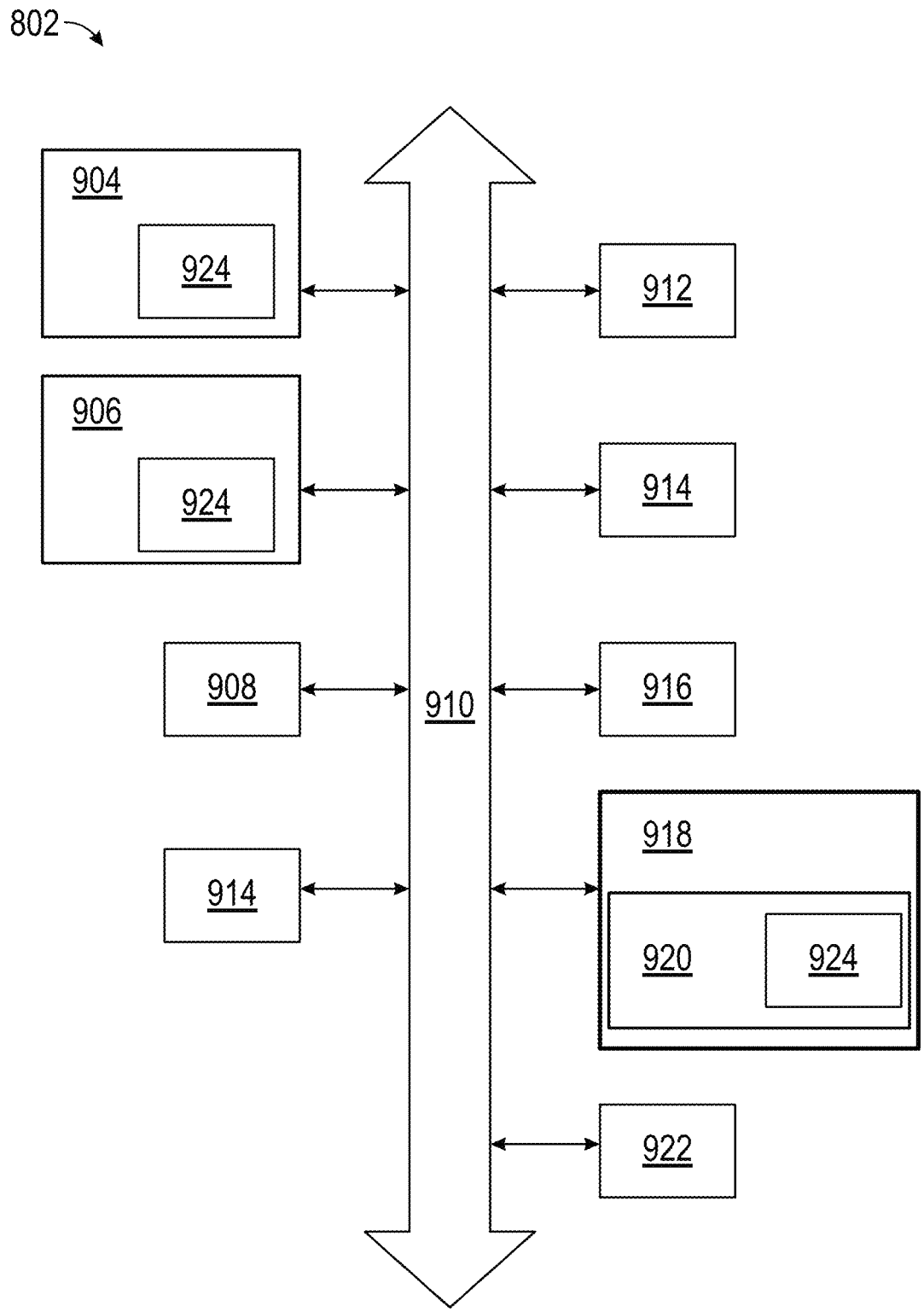
FIG. 8 illustrates a block diagram of an exemplary system, according to embodiments of the disclosure.

The regulatory tree parser discussed above may be implemented by a system. FIG. 8 illustrates a block diagram of an exemplary system 802, according to embodiments of the disclosure. The system may be a machine such as a computer, within which a set of instructions, causes the machine to perform any one of the steps and processes discussed herein, according to embodiments of the disclosure. In some embodiments, the machine can operate as a standalone device or may be connected (e.g., networked) to other machines. In a networked configuration, the machine may operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, a switch or bridge, or any machine capable of executing a set of instructions (sequential or otherwise) that specify actions to be taken by that machine. A mobile device such as a PDA or a cellular phone may also include an antenna, a chip for sending and receiving radio frequency transmissions and communicating over cellular phone WAP and SMS networks, and a built-in keyboard. Further, while only a single machine is illustrated, the term "machine" shall also be taken to include any collection of machines that individually or jointly execute a set (or multiple sets) of instructions to perform any one of the methodologies discussed herein.

The exemplary computer 802 includes a processor 904 (e.g., a central processing unit (CPU), a graphics processing unit (GPU), or both), a main memory 906 (e.g., read-only memory (ROM), flash memory, dynamic random access memory (DRAM) such as synchronous DRAM (SDRAM) or Rambus DRAM (RDRAM), etc.), and a static memory 908 (e.g., flash memory, static random access memory (SRAM), etc.), which can communicate with each other via a bus 910.

The computer 902 may further include a video display 912 (e.g., a liquid crystal display (LCD) or a cathode ray tube (CRT)). The computer 902 also includes an alpha-numeric input device 914 (e.g., a keyboard), a cursor control device 916 (e.g., a mouse), a disk drive unit 918, a signal generation device 920 (e.g., a speaker), and a network interface device 922.

The drive unit 918 includes a machine-readable medium 920 on which is stored one or more sets of instructions 924 (e.g., software) embodying any one or more of the methodologies or functions described herein. The software may also reside, completely or at least partially, within the main memory 906 and/or within the processor 904 during execution thereof by the computer 902, the main memory 906 and the processor 904 also constituting machine-readable media. The software may further be transmitted or received over a network 804 via the network interface device 922.

While the machine-readable medium 920 is shown in an exemplary embodiment to be a single medium, the term "non-transitory computer-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
receiving one or more regulatory documents, wherein the one or more regulatory documents are from one or more regulation sources or include one or more regulatory-based words;

parsing the one or more regulatory documents, wherein the parsing comprises:
- partitioning text of the one or more regulatory documents into segments of text, wherein each segment of text is located between adjacent formatting features;
- organizing the segments of text according to a hierarchy, wherein the hierarchy is indicative of a structure of the segments of text in the one or more regulatory documents, wherein the segments of text are organized into a predetermined, single format;

creating a regulatory tree, the regulatory tree including a plurality of nodes and a plurality of edges, each of the plurality of nodes representing one of the segments of text and each of the plurality of edges representing a relationship between two of the segments of text, wherein creating the regulatory tree comprises:
- storing the organized segments of text into one or more files, wherein each of the one or more files includes one or more lines, each of the one or more lines associated with one of the segments of text;
- retrieving a targeted line of the one or more lines;
- concatenating values in non-text fields of the targeted line and inserting columns between the values;
- storing the concatenated values in one or more first columns;
- storing a text field of the targeted line in one or more second columns;
- specifying the one or more first columns as corresponding to the plurality of edges;
- specifying the one or more second columns are corresponding to the plurality of nodes;
- organizing the plurality of nodes in the regulatory tree in levels in the hierarchy; and
- connecting nodes having different levels in the hierarchy using the plurality of edges; and storing the one or more regulatory trees in a datastore or sending the one or more regulatory trees to one or more downstream applications.

2. The method of claim 1, wherein the one or more regulatory documents have different formats when received.

3. The method of claim 1, wherein the regulatory tree includes multiple structured trees, each structured tree is associated with one of the one or more regulatory documents, wherein relationships between the one or more regulatory documents are represented by edges connecting the multiple structured trees.

4. The method of claim 1, wherein each of the one or more files includes a line comprising field names.

5. The method of claim 1, wherein the organized segments of text of at least two of the one or more regulatory documents are stored in the same file.

6. The method of claim 1, wherein the organizing the segments of text includes organizing the segments of text into one or more fields, wherein at least one of the one or more fields includes a reference to an upper level in the hierarchy.

7. The method of claim 1, wherein the organizing the segments of text includes organizing the segments of text into one or more fields, wherein at least one of the one or more fields includes a numerical value representative of an upper level of the hierarchy.

8. The method of claim 1, wherein the formatting features include alphanumeric-based numbering, symbolic numbering, or positional information.

9. The method of claim 1, wherein at least two segments of text in the same level of the regulatory tree is associated with the same type of formatting feature.

10. The method of claim 1, wherein at least one of the plurality of nodes stores a corresponding segment of text as a text attribute.

11. The method of claim 1, wherein the formatting features of the one or more regulatory documents are determined before the parsing step.

12. The method of claim 1, wherein the hierarchy is determined before the parsing step.

13. The method of claim 1, wherein the one or more regulation sources include U.S. Code website, Code of Federal Regulations website, Bulletins from the Office of the Comptroller of the Currency website, Federal Research Board website, and Financial Industry Regulatory Authority website.

14. A method comprising:
- receiving a leaf node citation;
- searching for a leaf node in a regulatory tree, wherein the leaf node is associated with the leaf node citation, wherein the regulatory tree includes a plurality of nodes and a plurality of edges, each of the plurality of nodes representing a segment of text and each of the plurality of edges representing a relationship between two segments of text, wherein the plurality of nodes in the regulatory tree are organized in levels of a hierarchy, wherein the hierarchy is indicative of a structure of segments of text in a regulatory document;
- wherein the regulatory tree is created by a process comprising:
  - storing organized segments of text into one or more files, wherein each of the one or more files includes one or more lines, each of the one or more lines associated with one of the segments of text;
  - retrieving a targeted line of the one or more lines;
  - concatenating values in non-text fields of the targeted line and inserting columns between the values;
  - storing the concatenated values in one or more first columns;
  - storing a text field of the targeted line in one or more second columns;
  - specifying the one or more first columns as corresponding to the plurality of edges; and
  - specifying the one or more second columns are corresponding to the plurality of nodes;
- retrieving a text attribute;
- prepending the text attribute to a leaf node citation text;
- traversing to an upper level node of the regulatory tree, the upper level node having a level of the hierarchy higher than a level of the respective node;
- repeating the retrieving, the prepending, and the traversing steps for each node in a path of the leaf node citation; and
- providing the leaf node citation text.

15. The method of claim 14, wherein the traversing step comprises traversing less than all of the regulatory tree.

16. The method of claim 14, wherein each node in the path stores portions of the leaf node citation text.

17. The method of claim 14, wherein the leaf node stores a text attribute at an end of the leaf node citation.

18. A non-transitory computer readable medium, the computer readable medium including instructions that, when executed, perform a method for processing one or more regulatory documents, the method comprising:

receiving the one or more regulatory documents, wherein the one or more regulatory documents are from one or more regulation sources or include one or more regulatory-based words;

parsing the one or more regulatory documents, wherein the parsing comprises:

partitioning text of the one or more regulatory documents into segments of text, wherein each segment of text is located between adjacent formatting features;

organizing the segments of text according to a hierarchy, wherein the hierarchy is indicative of a structure of the segments of text in the one or more regulatory documents, wherein the segments of text are organized into a predetermined, single format;

creating a regulatory tree, the regulatory tree including a plurality of nodes and a plurality of edges, each of the plurality of nodes representing one of the segments of text and each of the plurality of edges representing a relationship between two of the segments of text, wherein creating the regulatory tree comprises:

storing the organized segments of text into one or more files, wherein each of the one or more files includes one or more lines, each of the one or more lines associated with one of the segments of text;

retrieving a targeted line of the one or more lines;

concatenating values in non-text fields of the targeted line and inserting columns between the values;

storing the concatenated values in one or more first columns;

storing a text field of the targeted line in one or more second columns;

specifying the one or more first columns as corresponding to the plurality of edges;

specifying the one or more second columns are corresponding to the plurality of nodes;

organizing the plurality of nodes in the regulatory tree in levels in the hierarchy; and connecting nodes having different levels in the hierarchy using the plurality of edges; and storing the one or more regulatory trees in a datastore or sending the one or more regulatory trees to one or more downstream applications.

* * * * *